UNITED STATES PATENT OFFICE.

WILLIAM N. BLAKEMAN, JR., OF NEW YORK, N. Y.

OIL.

No. 883,519.  Specification of Letters Patent.  Patented March 31, 1908.

Application filed July 14, 1904. Serial No. 216,568.

*To all whom it may concern:*

Be it known that I, WILLIAM N. BLAKEMAN, Jr., a citizen of the United States, and resident of the borough of Manhattan, in the city, county, and State of New York, have invented certain new and useful Improvements in Oils, which invention is fully set forth in the following specification.

The object of this invention is to produce an oil-vehicle which shall be particularly adapted for use with those pigments which carry no water in combination and were formerly known as anhydrous, but which may also be designated as pigments containing no hydroxyl, all of these pigments being deficient in spreading power when ground in the usual oil vehicle.

Linseed and other oils used as paint-vehicles are, as found in commerce, regarded and sold as normal or neutral, although a chemical examination thereof will generally show the presence therein of a varying quantity of free acid; but, whether this commercial oil be found neutral or acid upon such examination, no white pigment with the exception of Dutch lead, has sufficient spreading power when ground therein, to be used as a sole basis for paint, this property of Dutch lead being due to the hydrated oxid of lead which it carries in combination.

I have discovered that commercial neutral oil can be so treated that all those pigments which ordinarily are deficient in spreading power shall, when ground therewith and applied as a paint, produce a smooth, uniform homogeneous and elastic film similar to that obtained by the combination of Dutch lead and linseed oil. This I accomplish by incorporating with the oil a rancidified agent, as will now be described.

I carry out my process by incorporating with commercial linseed, or other animal or vegetable oil, a rancidified agent composed of an oil or fat, or a derivative of an oil or fat, in a state of rancidity.

To form my rancidified agent, I take an oil or fat (or a derivative thereof)—say linseed oil—and expose it in broad surfaces to light and air until it has rancidified and indicates, by test, the presence of five or six per cent. of hydrated fatty acids not found in commercial oil. I then incorporate about five per cent. of this highly rancidified oil, with commercial linseed, or other, oil, with which it is miscible, and such commercial oil will then show the presence of from 25/100 to 30/100 of one per cent. of hydrated fatty acids for the entire bulk of oil. The maximum quantity of hydrated fatty acids for the rancidified agent, would seem to be, according to my experiments, from 8 to 10 per cent., and five per cent. of this rancidified oil when introduced into commercial neutral oil will indicate from 40/100 to 50/100 of one per cent. of hydrated fatty acids for the entire bulk of oil. If the rancidified agent exhibits more than about 10 per cent. of hydrated fatty acids, it will no longer be entirely miscible with, or soluble in, commercial neutral oil, but will clot and flock and tend to defeat the process.

As the method of forming a rancidified agent by merely exposing an oil or fat to air and light, will be found to be a slow one, quicker results may be obtained by first oxidizing the oil or fat either by boiling it on oxidizers (such as manganese oxid) or by submitting it with heat to the action of pure oxygen under pressure, or by passing through it, with heat, thoroughly dried air; and then exposing it to the action of air and light until it has sufficiently rancidified.

Any animal or vegetable oil or fat, or a derivative thereof—such as oleic acid—may be rancidified and used as a rancidified agent in carrying out my process.

Commercial linseed, or other animal or vegetable oil, treated by my process with a rancidified agent, as above described, will not be affected in fluidity, and the oil-vehicle formed will be found to impart spreading power to all those pigments which ordinarily are deficient in spreading power when ground in oil. Among the pigments which may be used, either singly or in combination, are zinc oxid, zinc sulfid, lead sulfate, lead sulfite, lead oxysulphate or sublimed lead, barium sulfate, barium carbonate, calcium carbonate, strontium sulfate, strontium carbonate and the like. Thus 100 parts of linseed oil showing 1/4 of one per cent. of hydrated fatty acids (by reason of the presence therein of my rancidified agent) when properly ground with 200 parts of oxysulfate of lead, or 80 parts each of lead sulfate and zinc oxid, or 30 parts each of zinc oxid, lead sulfate and barium sulfate, and spread as a paint (with the usual quantity of liquid drier) will follow the brush in a smooth and uniform film, in all respects equal to white lead in linseed oil.

The degree of rancidity of the rancidified agent, and the proportion of this agent to be introduced into commercial neutral oil, may be varied as practice shall dictate and will depend partly upon the character of the pigment with which the oil is to be used. For reasons above given, the agent should not be rancidified to exceed about 10 per cent. of hydrated fatty acids and if the commercial oil treated with the agent be caused to show the presence of about 25/100 or 35/100 of one per cent. of hydrated fatty acids, satisfactory results will be obtained. The presence of as little as 1/10 of one per cent. of such acids in the commercial oil will be found to exert a decided influence; but as much as one per cent., or even more, may be found necessary, in practice, to obtain the best results with a particular pigment or pigment-compound. It is obvious, however, that if in forming the vehicle, an agent be used which has been highly rancidified, a smaller percentage of such agent will be required than of an agent which has been only slightly rancidified. If desired, a uniform standard of rancidity may be adopted for the agent, and then the percentage of this agent to be used will be determined by the character of the pigment.

Heat, pressure and agitation, may be employed at any stage of the process, as may be desired.

I do not herein claim a paint compound made as herein described, the same being claimed in my application No. 301,569, filed February 17, 1906.

Having thus fully described my invention, I claim:

1. As a new composition of matter, a compound or mixture of a drying fatty oil, and a rancidified agent.

2. As a new composition of matter, a compound or mixture of a drying fatty oil, and a rancidified oil.

3. As a new composition of matter, a compound or mixture, of a drying fatty oil and rancidified linseed oil.

WM. N. BLAKEMAN, JR.

Witnesses:
 FRANCIS P. REILLY,
 CHAS. A. KANE.